(12) United States Patent
Lee (10) Patent No.: US 9,536,224 B2
(45) Date of Patent: Jan. 3, 2017

(54) METHOD, APPARATUS AND RECORDING MEDIUM FOR DISPLAYING TASKS

(71) Applicant: HTC Corporation, Taoyuan County (TW)

(72) Inventor: Chi-Min Lee, Taoyuan County (TW)

(73) Assignee: HTC Corporation, Taoyuan (TW)

( * ) Notice: Subject to any disclaimer, the term of this patent is extended or adjusted under 35 U.S.C. 154(b) by 251 days.

(21) Appl. No.: 13/666,985

(22) Filed: Nov. 2, 2012

(65) Prior Publication Data

US 2013/0113739 A1    May 9, 2013

Related U.S. Application Data (60) Provisional application No. 61/554,978, filed on Nov. 3, 2011.

(51) Int. Cl.
 *G06Q 10/10* (2012.01)
(52) U.S. Cl.
 CPC ..................................... *G06Q 10/10* (2013.01)
(58) Field of Classification Search
 CPC ........... G06Q 30/0261; G06Q 30/0601; H04M 1/72572; H04M 2203/2072; H04M 2242/14; G06F 3/048; G06F 17/3087
 USPC .......................... 345/173–204; 455/455–457
 See application file for complete search history.

(56) References Cited

U.S. PATENT DOCUMENTS

| | | |
|---|---|---|
| 6,411,899 B2 | 6/2002 | Dussell et al. |
| 7,562,241 B2 | 7/2009 | Nurmi |
| 2002/0094846 A1 | 7/2002 | Kishimoto et al. |
| 2003/0023374 A1 | 1/2003 | Shimabara |
| 2003/0169306 A1 | 9/2003 | Makipaa et al. |
| 2004/0150664 A1 | 8/2004 | Baudisch |
| 2006/0075347 A1 | 4/2006 | Rehm |
| 2006/0200524 A1 | 9/2006 | Costenaro et al. |
| 2006/0230331 A1 | 10/2006 | Abanami et al. |
| 2007/0018957 A1 | 1/2007 | Seo |
| 2007/0073474 A1* | 3/2007 | Nakamura ................... 701/207 |
| 2007/0118520 A1* | 5/2007 | Bliss .................... G01C 21/367 |
| 2007/0130153 A1* | 6/2007 | Nachman .......... G06F 17/30241 |
| 2007/0150842 A1 | 6/2007 | Chaudhri et al. |
| 2007/0157089 A1 | 7/2007 | Van Os et al. |
| 2008/0108299 A1 | 5/2008 | Hullot et al. |
| 2008/0134052 A1 | 6/2008 | Davis et al. |

(Continued)

FOREIGN PATENT DOCUMENTS

| | | |
|---|---|---|
| CN | 1491379 A | 4/2004 |
| CN | 101222696 | 7/2008 |

(Continued)

OTHER PUBLICATIONS

Office Action of America Co-pending U.S. Appl. No. 13/398,857, issued on Aug. 23, 2013, p. 1-p. 24.
Office Action of Taiwan Counterpart Application, issued on Aug. 25, 2014, p. 1-p. 8.
Nugroho, "Context-aware Computing for Personalized Task Manager LBS," Master's thesis, Jun. 2009, School of Computer Science and Engineering, The University of New South Wales.

(Continued)

*Primary Examiner* — Michael Faragalla
(74) *Attorney, Agent, or Firm* — Jianq Chyun IP Office (57) ABSTRACT

A method, an apparatus, and a recording medium are provided. In the method, a mobile apparatus is positioned to obtain a positioning location and an electronic map around the positioning location is displayed. Then, at least one task stored in the mobile apparatus is accessed and each of the at least one task is marked on the electronic map according to a task location thereof.

14 Claims, 6 Drawing Sheets

(56) References Cited

U.S. PATENT DOCUMENTS

| | | | |
|---|---|---|---|
| 2009/0006991 A1 | 1/2009 | Lindberg et al. | |
| 2009/0105947 A1* | 4/2009 | Nachesa et al. | 701/209 |
| 2009/0239552 A1* | 9/2009 | Churchill et al. | 455/456.3 |
| 2010/0001967 A1 | 1/2010 | Yoo | |
| 2010/0004005 A1* | 1/2010 | Pereira | H04W 4/02 455/457 |
| 2010/0058244 A1 | 3/2010 | Wang | |
| 2010/0106801 A1* | 4/2010 | Bliss | G06F 17/3087 709/219 |
| 2010/0146384 A1 | 6/2010 | Peev et al. | |
| 2010/0159995 A1 | 6/2010 | Stallings et al. | |
| 2010/0223569 A1 | 9/2010 | Vuong et al. | |
| 2010/0257490 A1 | 10/2010 | Lyon et al. | |
| 2010/0269040 A1 | 10/2010 | Lee | |
| 2010/0306705 A1 | 12/2010 | Nilsson | |
| 2010/0306718 A1 | 12/2010 | Shim et al. | |
| 2011/0035691 A1 | 2/2011 | Kim | |
| 2011/0041102 A1 | 2/2011 | Kim | |
| 2011/0047368 A1 | 2/2011 | Sundaramurthy et al. | |
| 2011/0105193 A1 | 5/2011 | Lee et al. | |
| 2011/0119625 A1 | 5/2011 | Moon | |
| 2012/0052880 A1* | 3/2012 | Hymel | H04W 4/206 455/456.3 |
| 2012/0289254 A1* | 11/2012 | Dishneau | G06Q 10/1097 455/456.3 |

FOREIGN PATENT DOCUMENTS

| | | |
|---|---|---|
| CN | 101371258 | 2/2009 |
| CN | 101371258 A | 2/2009 |
| CN | 101385318 | 3/2009 |
| CN | 101390038 | 3/2009 |
| CN | 101404680 A | 4/2009 |
| CN | 101413996 | 4/2009 |
| CN | 101436113 | 5/2009 |
| CN | 101625620 | 1/2010 |
| CN | 101763284 | 6/2010 |
| CN | 101828162 | 9/2010 |
| CN | 101976171 | 2/2011 |
| CN | 102023793 | 4/2011 |
| CN | 102132131 | 7/2011 |
| CN | 102239469 | 11/2011 |
| EP | 2060970 | 5/2009 |
| TW | 200717337 | 5/2007 |
| TW | 200844837 | 11/2008 |
| TW | 200928952 | 7/2009 |
| TW | 201030573 | 8/2010 |
| TW | 201129926 | 9/2011 |
| WO | 2010136854 | 12/2010 |

OTHER PUBLICATIONS

Office Action of Germany counterpart application issued on Nov. 5, 2012, p. 1-p. 8.
Office Action of China Counterpart Application, issued on Jul. 25, 2014, p. 1-p. 8.
Office Action of US Counterpart Application, issued on Sep. 12, 2013, p. 1-p. 36.
Office Action of Taiwan Counterpart Application, issued on May 16, 2014, p. 1-p. 10.
Search Report of European Counterpart Application, issued on Jan. 24, 2013, p. 1-p. 3.
Search Report of European Counterpart Application, issued on Jan. 21, 2013, p. 1-p. 3.
Search Report of European Counterpart Application, issued on Jan. 18, 2013, p. 1-p. 4.
Office Action of European Counterpart Application, issued on Jan. 30, 2013, p. 1-p. 5.
Search Report of European Counterpart Application, issued on May 23, 2012, p. 1-p. 3.
Office Action of China Counterpart Application, issued on Jan. 28, 2014, p. 1-p. 7.
First Office Action of China Counterpart Application, issued on Mar. 4, 2014, p. 1-p. 10.
Office Action of China Counterpart Application, issued on Feb. 21, 2014, p. 1-p. 8.
Office Action of Taiwan Counterpart Application, issued on Feb. 11, 2015, p. 1-p. 7.
Office Action of Co-pending U.S. Appl. No. 13/398,857, issued on Nov. 5, 2014, p. 1-p. 24.
Office Action of China Counterpart Application, issued on Nov. 2, 2014, p. 1-p. 7.
Office Action of Taiwan Counterpart Application, issued on Nov. 26, 2014, p. 1-p. 6.
Office Action of Related U.S. Appl. No. 13/398,857, issued on Apr. 7, 2015, p. 1-p. 21.
Office Action of China Related Application, application No. 201210343243.6, issued on May 6, 2015, p. 1-p. 7.
Office Action of China Related Application, application No. 201310007092.1, issued on Mar. 30, 2015, p. 1-p. 9.
Office Action of China Counterpart Application, issued on Mar. 19, 2015, p. 1-p. 10.
Office Action of US Counterpart Application, issued on Oct. 22, 2015, p. 1-p. 5.
Office Action of China Counterpart Application , issued on Sep. 28, 2015, p. 1-p. 10.

* cited by examiner

METHOD, APPARATUS AND RECORDING MEDIUM FOR DISPLAYING TASKS

CROSS-REFERENCE TO RELATED APPLICATION

This application claims the priority benefit of U.S. provisional application Ser. No. 61/554,978, filed on Nov. 3, 2011. The entirety of the above-mentioned patent application is hereby incorporated by reference herein and made a part of this specification.

BACKGROUND

Technical Field

The application relates to a method and an apparatus for displaying tasks. Particularly, the application relates to a method, an apparatus, and a recording medium for displaying tasks on an electronic map.

Related Art

In recent years, with development and improvement of electronic technology and communication techniques, portable electronic apparatuses such as mobile phones and smart phones that occupy less space are also quickly developed. Generally, multiple functions are integrated into mobile apparatuses in the market to improve competitiveness thereof, and besides general camera, phone call, and Internet access functions, a global positioning system (GPS) and an electronic map are also integrated into a handheld communication apparatus, and a user can learn the location of himself through a positioning function of the mobile device at any time, and inspect nearby restaurants, landmarks, attractions, or other points of interest displayed in an electronic map.

To-do task is another application provided by the mobile apparatus, which allows the user to preset tasks to be accomplished in the future, and includes related information of time, location, task content, and related personnel, etc., and when the preset time is reached, a sound or a notifying message is sent to remind the user.

However, when the user wants to check the preset tasks or the accomplished tasks, the mobile apparatus can only display a list of the tasks in rows, and cannot establish the correlation of the tasks. Therefore, the user can only inspect contents of the tasks one-by-one through selecting each of the tasks, and determine a handling sequence according to time and locations of the tasks by himself/herself, by which the tasks cannot be effectively and opportunely handled.

SUMMARY

The application is directed to a method, an apparatus, and a recording medium for displaying tasks, which assists a user in effectively dealing with tasks by displaying a nearby electronic map and the tasks.

The application provides a method for displaying tasks, which is adapted to a mobile apparatus having a touch screen. In the method, the mobile apparatus is positioned to obtain a positioning location, and an electronic map around the positioning location is displayed. Then, at least one task is accessed, and each of the at least one task is marked on the electronic map according to a task location thereof.

In an embodiment of the application, after the step of marking each of the at least one task on the electronic map according to the task location thereof, the method further includes receiving a touch operation performed at a specific location on the electronic map; and displaying a dialog window at the specific location to add a new task.

In an embodiment of the application, after the step of marking each of the at least one task on the electronic map according to the task location thereof, the method further includes receiving a switching operation; and accessing at least one accomplished task, and switching and marking each of the at least accomplished task on the electronic map according to a task location thereof.

In an embodiment of the application, the step of marking each of the at least one task on the electronic map according to the task location thereof includes marking the task with the task location within a display range of the electronic map on the electronic map.

In an embodiment of the application, the step of marking the tasks with the task locations within the display range of the electronic map on the electronic map includes merging the tasks with close task locations to be displayed in a same indicator, where the indicator displays a number of the merged tasks at an average location of the merged tasks on the electronic map.

In an embodiment of the application, after the step of merging the tasks with close task locations to display the same indicator, the method further includes receiving a selecting operation performed on the indicator; and displaying a list of the tasks merged in the indicator.

In an embodiment of the application, after the step of marking each of the at least one task on the electronic map according to the task location thereof, the method further includes receiving a zoom out operation performed on the electronic map to zoom out the electronic map, and merging the tasks with close task locations to be displayed in a same indicator according to a scale of the zoomed out electronic map, where a distance between the task locations of the merged tasks is smaller than a first threshold value; and receiving a zoom in operation performed to the electronic map to zoom in the electronic map, and dividing the indicator with a plurality of merged tasks into a plurality of indicators according to a scale of the zoomed in electronic map, where a distance between the task locations of the tasks is greater than a second threshold value.

In an embodiment of the application, the step of marking each of the at least one task on the electronic map according to the task location thereof includes marking the task with the task location outside the display range of the electronic map at an edge of the electronic map corresponding to the task location.

In an embodiment of the application, the step of marking the task with the task location outside the display range of the electronic map at the edge of the electronic map corresponding to the task location includes: according to a direction of each of the tasks outside the display range relative to a center of the electronic map, displaying an indicator of the task within the electronic map at an edge facing to the direction.

In an embodiment of the application, the step of marking the task with the task location outside the display range of the electronic map at the edge of the electronic map corresponding to the task location includes merging a plurality of tasks at a same edge to be displayed in a same indicator, where the indicator displays a number of the tasks.

In an embodiment of the application, the step of merging a plurality of tasks at the same edge to be displayed in the same indicator includes displaying the indicator in the middle or at an endpoint of the edge of the electronic map.

In an embodiment of the application, the step of merging a plurality of tasks at the same edge to display the same indicator includes: according to a direction of each of the tasks outside the display range relative to a center of the electronic map, calculating an edge location of each of the tasks in the electronic map facing to the direction; calculating an average location of the edge locations of the tasks at the same edge; and displaying the indicator indicating a number of the tasks at the same edge at the average location.

The application provides an apparatus for displaying tasks including a touch screen, a storage unit, a positioning unit, a map display module and a task display module. The touch screen detects a touch operation and displays a frame. The storage unit stores at least one task. The positioning unit positions the display apparatus to obtain a positioning location. The map display module displays an electronic map around the positioning location on the touch screen. The task display module accesses the at least one task stored in the storage unit, and marks each of the at least one task on the electronic map displayed on the touch screen according to a task location thereof.

In an embodiment of the application, the task display module displays a dialog window at a specific location to add a new task when the touch screen receives the touch operation performed at the specific location on the electronic map.

In an embodiment of the application, the storage unit stores at least one accomplished task, and the task display module accesses the at least one accomplished task stored in the storage unit when the touch screen receives a switching operation, and switches and marks each of the at least accomplished task on the electronic map according to a task location thereof.

In an embodiment of the application, the task display module merges a plurality of tasks with close task locations to be displayed in a same indicator, where the indicator displays a number of the merged tasks at an average location of the merged tasks on the electronic map.

In an embodiment of the application, the task display module displays a list of the tasks merged in the indicator when the touch screen receives a selecting operation performed on the indicator.

In an embodiment of the application, when the touch screen receives a zoom out operation performed to the electronic map, the map display module zooms out the electronic map, and the task display module merges a plurality of tasks with close task locations to be displayed in a same indicator according to a scale of the zoomed out electronic map, where a distance between the task locations of the tasks is smaller than a first threshold value.

In an embodiment of the application, when the touch screen receives a zoom in operation performed on the electronic map, the map display module zooms in the electronic map, and the task display module divides the indicator with a plurality of merged tasks into a plurality of indicators according to a scale of the zoomed in electronic map, where a distance between the task locations of the tasks is greater than a second threshold value.

The application provides a recording medium (for example, an optical disk, a floppy disk and a hard disk, etc.), which stores a computer-readable program for executing the aforementioned method for displaying tasks. The program is composed of a plurality of program instructions (for example, an organization chart establishing program instruction, a table approving program instruction, a setting program instruction, and a deployment program instruction, etc), and these program instructions are loaded into a mobile apparatus and executed by the same to accomplish various steps of the method for displaying tasks.

According to the above descriptions, in the method, the apparatus and the recording medium for displaying tasks, the nearby electronic map is displayed and locations or directions of the tasks are marked on the electronic map, which assists the user in learning a position correlation of the tasks, so as to determine a handling sequence, and assists the user in effectively handling the tasks.

In order to make the aforementioned and other features and advantages of the application comprehensible, several exemplary embodiments accompanied with figures are described in detail below.

BRIEF DESCRIPTION OF THE DRAWINGS

The accompanying drawings are included to provide a further understanding of the application, and are incorporated in and constitute a part of this specification. The drawings illustrate embodiments of the application and, together with the description, serve to explain the principles of the application.

DETAILED DESCRIPTION OF DISCLOSED EMBODIMENTS

Execution of each task relates to necessary conditions such as time, place, action, and personnel, and regarding tasks dispersed at different locations, a most effective handling method is to go through those locations by using an optimal path or an optimal sequence, and handle all of the tasks at each location in one-time. The application provides a method, an apparatus, and a recording medium for displaying tasks according to the aforementioned demand, by which nearby tasks are marked in an independent display manner or a group display manner on an electronic map displaying the surrounding area, and a shortest path or a handling sequence is planned according to relative locations of the tasks, which avails assisting a user in learning related information of the nearby tasks, so as to determine an optimal manner to handle the tasks. Details of the embodiments of the application are described below.

Figure 1:
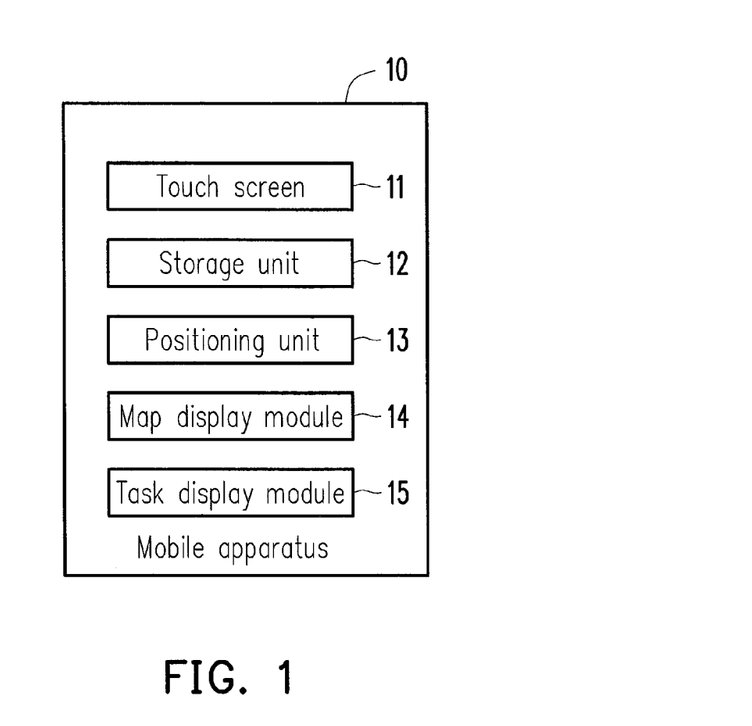
FIG. 1 is a block diagram of an apparatus for displaying tasks according to an embodiment of the application.

FIG. 1 is a block diagram of an apparatus for displaying tasks according to an embodiment of the application. Referring to FIG. 1, a mobile apparatus 10 of the embodiment is, for example, a mobile phone, a smart phone, a personal digital assistant (PDA), a PDA phone, a notebook computer, or a tablet computer, which comprises a touch screen 11, a storage unit 12, a positioning unit 13, a map display module 14, and a task display module 15, and functions thereof are respectively described below.

The touch screen 11 is, for example, formed by integrating a resistive, capacitive, or other types of touch sensing device and a liquid crystal display (LCD), or any display having a touch operation function, which can detect a touch operation of a user while displaying a frame of the mobile apparatus 10.

The storage unit 12 is, for example, a storage medium such as a hard disk or a memory, or a storage medium at a remote end that is connected to the mobile apparatus 10 through a wireless connection. The storage unit 12 stores tasks on the mobile apparatus 10 that are set by the user and/or accomplished tasks and related information thereof.

The positioning unit 13 positions the mobile apparatus 10 to obtain a positioning location of the mobile apparatus 10, and the positioning unit 13 is, for example, a global positioning system (GPS) or other communication positioning system that uses a global system for mobile communication (GSM) system, a personal handy-phone system (PHS), a code division multiple access (CDMA) system, a wireless fidelity (Wi-Fi) system, worldwide interoperability for microwave access (WiMAX) system, a radio repeater, or a radio broadcaster for positioning, which is not limited by the application.

The map display module 14 and the task display module 15 are, for example, hardware devices composed of logic circuit elements and are suitable for executing a function for displaying tasks. These modules can also be programs stored in the storage module 12 of the mobile apparatus 10, which can be loaded to a processor of the mobile apparatus 10 to execute the function for displaying tasks. An embodiment is provided below to describe detailed steps of executing the function for displaying tasks by the mobile apparatus 10.

Figure 2:
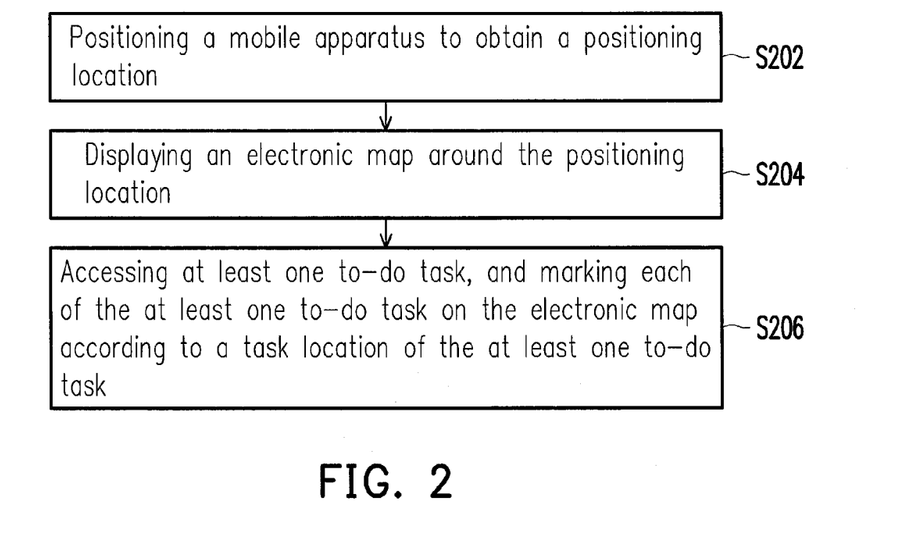
FIG. 2 is a flowchart illustrating a method for displaying tasks according to an embodiment of the application.

FIG. 2 is a flowchart illustrating a method for displaying tasks according to an embodiment of the application. Referring to FIG. 2, the method of the present embodiment is adapted to the mobile apparatus of FIG. 1, and detailed steps of the method for displaying tasks of the application are described below in collaboration with various components of the mobile apparatus 10.

First, the positioning unit 13 positions the mobile device 10 to obtain a positioning location of the mobile apparatus 10 (step S202). Then, the map display module 14 displays an electronic map around the positioning location on the touch screen 11 (step S204). The map display module 14, for example, displays the electronic map according to a predetermined scale, and adjusts a display range of the electronic map to locate the positioning location of the mobile apparatus 10 to the center of the electronic map. In another embodiment, the user can select a location through a menu or by tapping the electronic map, or find a location by inputting an address, a keyword or any other searching method, to serve as the positioning location at the center of the electronic map.

Then, the task display module 15 accesses the tasks stored in the storage unit 12, and marks each of the tasks on the electronic map displayed by the touch screen 11 according to a task location of each of the tasks (step S206). The storage unit 12 stores all of the tasks set by the user and related information thereof, where the tasks may include the received tasks set by other users. When the task display module 15 accesses the storage unit 12, according to a display range of the electronic map displayed by the map display module 14, the task display module 15 may only access the tasks with task locations within the display range.

It should be noticed that when the task display module 15 marks the tasks, the task display module 15, for example, merges a plurality of the tasks with the same or close task locations to be displayed in a same indicator, where the indicator is, for example, displayed at an average location of the locations of the merged tasks on the electronic map in a graphic manner, for example, in different patterns, figures, or colors, etc., and the number of the merged tasks or other information (for example, time information of the nearest task, or degrees of urgency or importance of the tasks) may be displayed in the indicator, which is not limited by the application.

Figure 3:
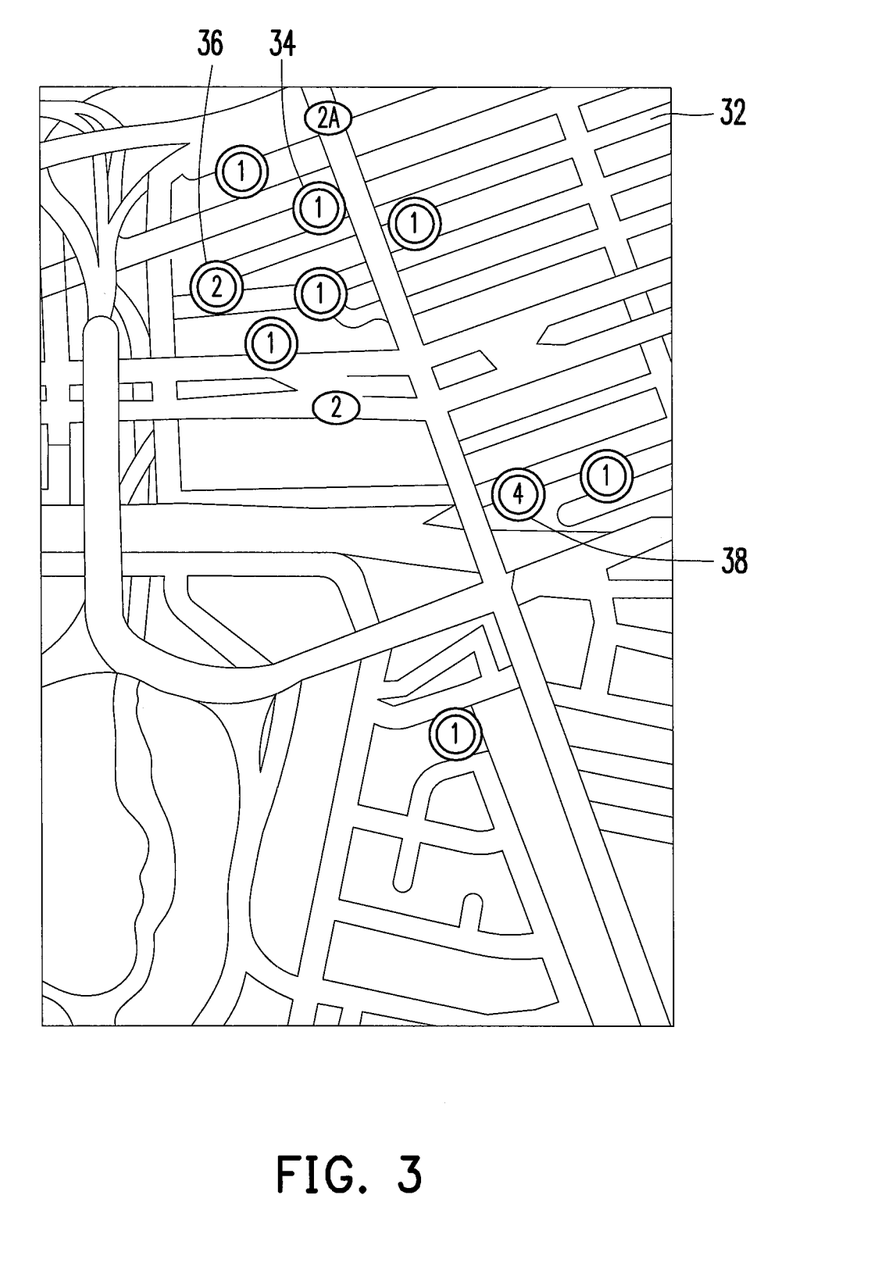
FIG. 3 is an example of displaying tasks according to an embodiment of the application.

For example, FIG. 3 is an example of displaying tasks according to an embodiment of the application. Referring to FIG. 3, in the present embodiment, a plurality of indicators are displayed on an electronic map 32, which include indicators displaying a single task (for example, an indicator 34 marked as "1") and indicators displaying multiple tasks (for example, an indicator 36 marked as "2" and an indicator 38 marked as "4"). According to the digits displayed in the indicator, the user can learn the number of the tasks at the location of the indicator.

According to the above method for displaying the tasks, the user can quickly browse the nearby tasks through the display apparatus 10 of the present embodiment, so as to determined a handling sequence of the tasks, for example, the user starts to handle the tasks from a nearest task. Moreover, the display apparatus 10 also provides functions related to tasks that the user can execute through a simple touch operation, and another embodiment is provided below for detailed descriptions.

Figure 4:
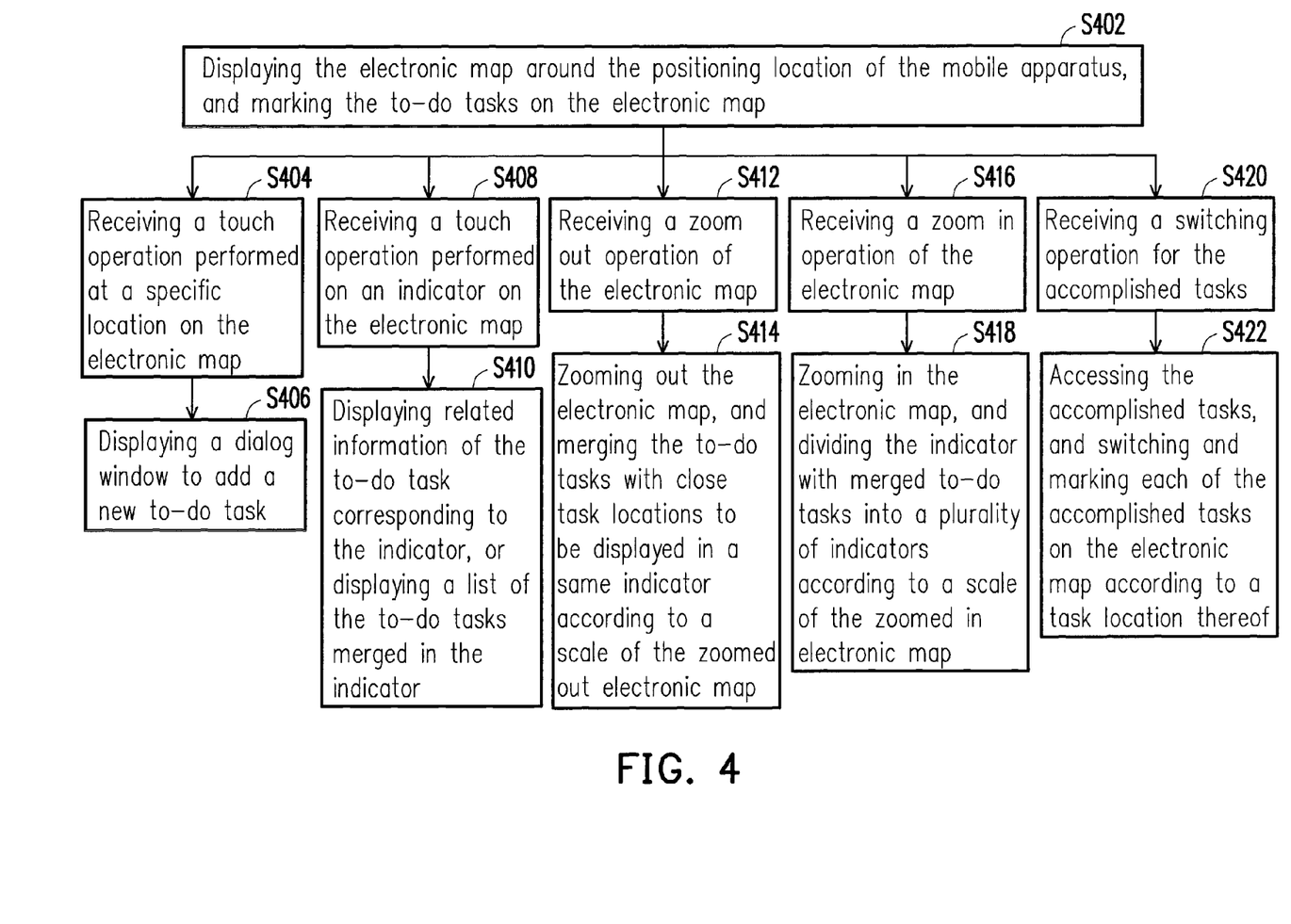
FIG. 4 is a flowchart illustrating a method for displaying tasks according to an embodiment of the application.

FIG. 4 is a flowchart illustrating a method for displaying tasks according to an embodiment of the application. Referring to FIG. 4, the method of the present embodiment is adapted to the mobile apparatus 10 of FIG. 1, and according to the method, the user can add a new task, query a content of the task, zoom in/out the electronic map, or switch and display the accomplished tasks through touch operations. Detailed steps of the method for displaying tasks of the application are described below in collaboration with various components of the mobile apparatus 10.

First, according to the flow of FIG. 2, the map display module 14 displays the electronic map around the positioning location of the mobile apparatus 10 on the touch screen 11, and the task display module 15 marks the tasks on the electronic map (step S402).

Regarding adding of a task, when the touch screen 11 receives a touch operation performed by the user at a specific location on the electronic map (step S404), the task display module 15 displays a dialog window at the specific location or at a default area on the touch screen 11 to facilitate the user adding a new task (step S406). The specific location is, for example, a point of interest (POI) on the electronic map, and the touch operation is, for example, a short press, long press, or double click at the specific location, which is not limited by the application. When the dialog window appears, the user can set information such as time and content of the task in the window. In another embodiment, the user can also select a location or a POI through a menu, input an address, or find a location through any searching method to add a new task.

Regarding querying a content of a task, when the touch screen 11 receives a touch operation performed on a certain indicator by the user (step S408), regarding the indicator that only indicates a single task, the task display module 15 displays related information of the task, which includes time, location, action, and personnel of the task; regarding the indicator that merges and displays a plurality of tasks, the task display module 15 displays a list of the tasks merged in the indicator (step S410), which facilitates the user to learn all of the tasks at such location.

Figure 5:
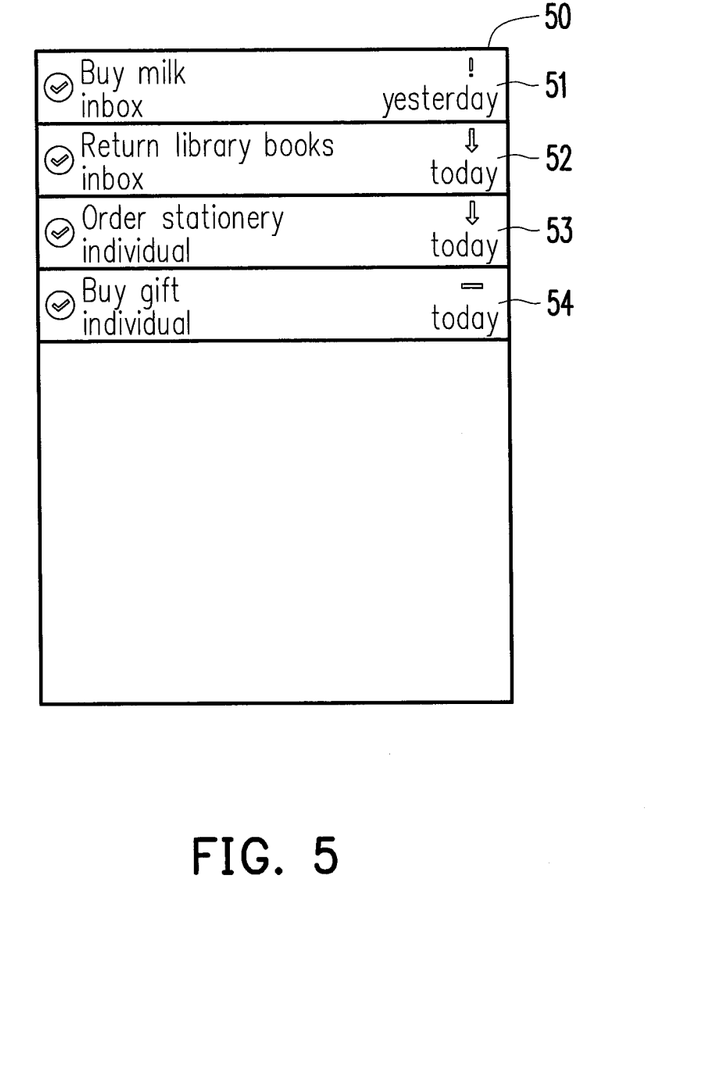
FIG. 5 is an example of displaying tasks according to an embodiment of the application.

For example, FIG. 5 is an example of displaying tasks according to an embodiment of the application. Referring to FIG. 3 and FIG. 5, in the present embodiment, after the user clicks the indicator 38 on the electronic map 32, a task list 50 included in the indicator 38 is displayed on the screen. Tasks 51, 52, 53, and 54 in the task list 50 are preset to be handled at the location of the indicator 38. In an embodiment, these tasks may be arranged according to a time sequence, or may be arranged according to the distances of the locations, which is not limited by the application.

Regarding zoom in/out of the electronic map, when the touch screen 11 receives a zoom out operation of the electronic map performed by the user (step S412), the map display module 14 zooms out the electronic map, and the task display module 15 merges the tasks with close task locations to display with a same indicator according to a scale of the zoomed out electronic map (step S414). The task display module 15, for example, performs the merging operation on the tasks with a distance there between smaller than a first threshold value, and if the user continuously performs the zoom out operation, the task display module 15 further merges the tasks with close task locations to display with a same indicator, for example, the tasks with a distance there between smaller than another threshold value are further merged. On the other hand, when the touch screen 11 receives a zoom in operation of the electronic map performed by the user (step S416), the map display module 14 zooms in the electronic map, and the task display module 15 divides the indicator with merged tasks into a plurality of indicators according to a scale of the zoomed in electronic map (step S418). The task display module 15, for example, performs the dividing operation on the tasks with a distance there between greater than a second threshold value, and if the user continuously performs the zoom in operation, the task display module 15 further divides the merged tasks, for example, divides the tasks with a distance there between greater than another threshold value.

Regarding switching of the accomplished tasks, besides the to-do tasks, the storage unit 12, for example, further stores tasks previously accomplished by the user. When the touch screen 11 receives a switching operation from the user (step S420), the task display module 15 accesses the accomplished tasks stored in the storage unit 12, and switches and marks each of the accomplished tasks on the electronic map according to the task location thereof (step S422). The switching operation is, for example, an operation that the user taps a switch button on the touch screen 11, and the accomplished tasks are, for example, marked on the electronic map together with the tasks, or independently displayed on the electronic map without displaying the to-do tasks, which is not limited by the application.

According to the above touch operation, the user can execute required operation functions of the tasks through simple touch operations, so as to improve usage convenience of the tasks of the mobile apparatus 10.

It should be noticed that besides the tasks within the display range of the electronic map, the application further displays tasks outside the display range at an edge of the electronic map, so that the user can learn relative locations of the other tasks, so as to query or handle the tasks outside the display range. Another embodiment is provided below for detailed descriptions.

Figure 6:
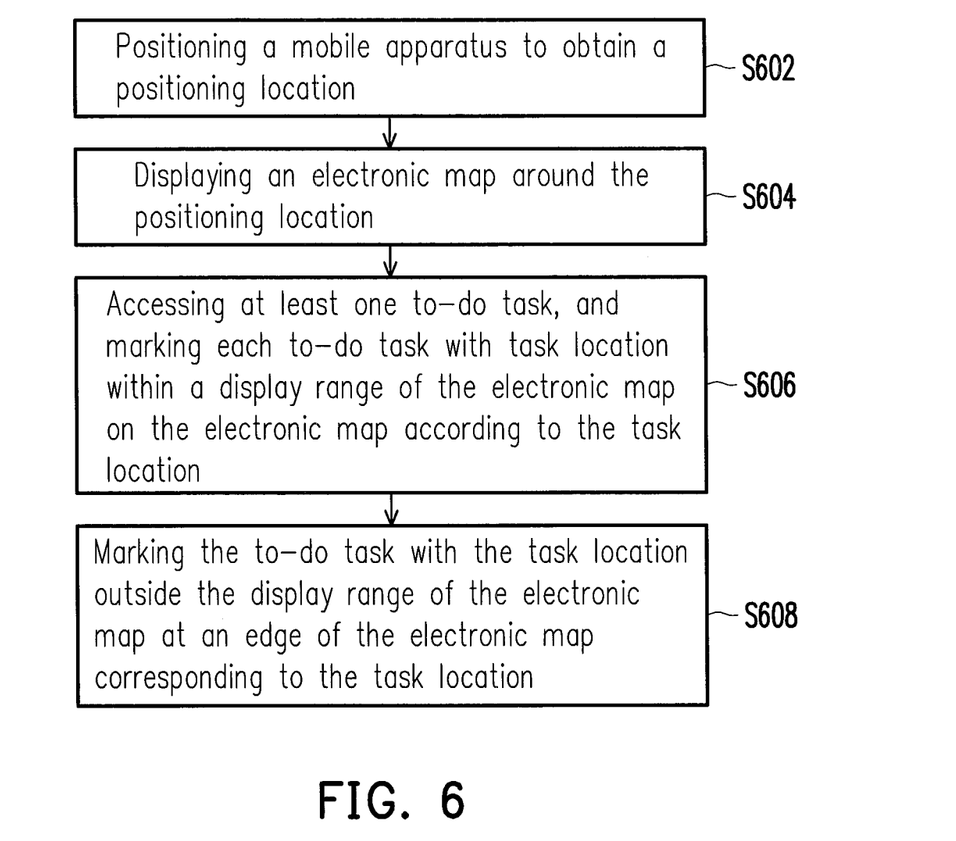
FIG. 6 is a flowchart illustrating a method for display tasks according to an embodiment of the application.

FIG. 6 is a flowchart illustrating a method for display tasks according to an embodiment of the application. Referring to FIG. 6, the method of the application is adapted to the mobile apparatus 10 of FIG. 1, and detailed steps of the method for displaying tasks of the application are described below in collaboration with various components of the mobile apparatus 10.

First, the positioning unit 13 positions the mobile device 10 to obtain a positioning location of the mobile apparatus 10 (step S602), and the map display module 14 displays an electronic map around the positioning location on the touch screen 11 (step S604).

Then, the task display module 15 accesses the tasks stored in the storage unit 12, and marks the tasks with task locations within the display range of the electronic map on the electronic map according to the task locations (step S606), and marks each of the tasks with the task location outside the display range of the electronic map at an edge of the electronic map corresponding to the task location (S608).

In an embodiment, according to a direction of each of the tasks outside the display range relative to a center of the electronic map, the task display module 15 displays an indicator of the task within the electronic map at an edge facing to the direction.

In another embodiment, the task display module 15, for example, merges a plurality of tasks at a same edge to display with a same indicator, where the indicator, for example, displays a number of the merged tasks, and the indicator is in the middle or at an endpoint of the edge of the electronic map. Moreover, the task display module 15 may display the indicator according to an average location of the tasks at the same edge or a location obtained according to the other algorithm. In detail, according to a direction of each of the tasks outside the display range relative to a center of the electronic map, the task display module 15 calculates an edge location of each of the tasks in the electronic map facing to the direction, and calculates an average location of the edge locations of the tasks at the same edge, and finally displays the indicator indicating a number of the tasks at the same edge at the average location of the electronic map.

Figure 7:
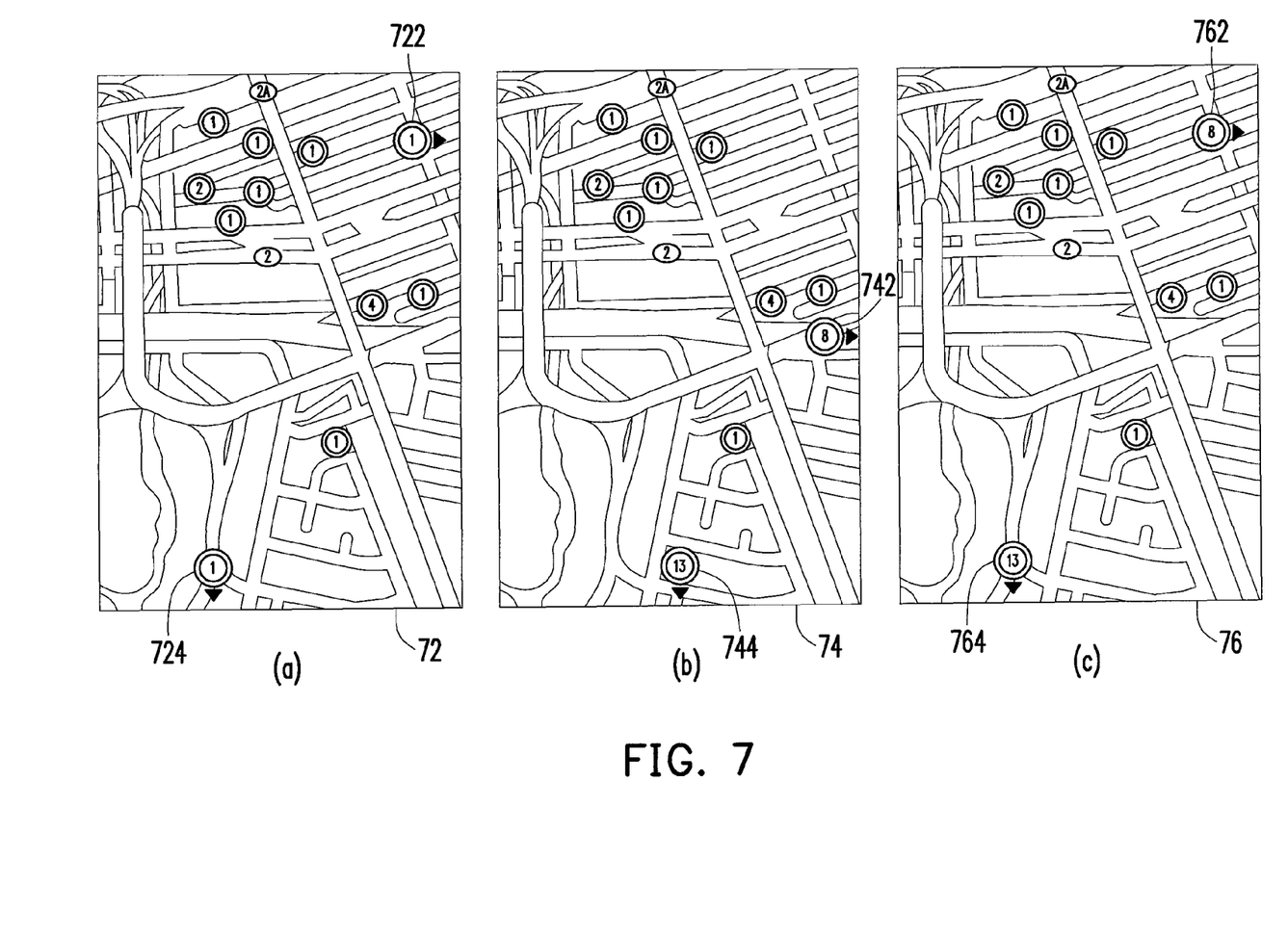
FIGS. 7(a)-7(c) are examples of displaying tasks according to an embodiment of the application.

For example, FIGS. 7(a)-7(c) are examples of displaying tasks according to an embodiment of the application. In an electronic map 72 of FIG. 7(a), according to a direction of each of the tasks relative to a center of the electronic map, an indicator of the task is displayed within the electronic map at an edge facing to the direction (for example, the indicators 722 and 724). In an electronic map 74 of FIG. 7(b), a plurality of tasks at a same edge are merged to display with a same indicator, and the number of the merged tasks is indicated in the indicator, and the indicator is displayed in the middle or at an endpoint of the edge of the electronic map (for example, the indicators 742 and 744). In an electronic map 76 of FIG. 7(c), a plurality of tasks at a same edge are merged to display with a same indicator, and an average location of the edge locations of the tasks at the same edge are calculated, and the indicator of the tasks is displayed at the average location (for example, the indicators 762 and 764). In an embodiment, the tasks may also be displayed on a boundary of the electronic map or outside the boundary, which represents that the locations of these tasks are outside the display range of the electronic map.

The application further provides a recording medium, which stores a computer-readable program for executing the aforementioned method for displaying tasks. The program is composed of a plurality of program instructions (for example, an organization chart establishing program instruction, a table approving program instruction, a setting program instruction, and a deployment program instruction, etc), and these program instructions are loaded into a mobile apparatus and executed by the same to accomplish various steps of the method for displaying tasks.

In summary, in the method, the apparatus, and the recording medium for displaying tasks, the nearby electronic map is displayed and the locations or directions of the tasks are marked on the electronic map, which assists the user in learning a position correlation of the tasks, so as to determine a handling sequence. Moreover, the user can execute related functions of the tasks through simple touch operations, which assists the user to effectively handle the tasks.

It will be apparent to those skilled in the art that various modifications and variations can be made to the structure of the application without departing from the scope or spirit of the application. In view of the foregoing, it is intended that the application cover modifications and variations of this application provided they fall within the scope of the following claims and their equivalents.

What is claimed is:

1. A method for displaying tasks, adapted to a mobile apparatus having a touch screen, the method comprising:
   positioning the mobile apparatus to obtain a positioning location;
   displaying an electronic map around the positioning location; and
   accessing each task recorded in the mobile apparatus, and marking each of the tasks on the electronic map according to a corresponding task location,
      wherein each task with the task location within a display range of the electronic map is marked at the task location on the electronic map, and
      wherein each task with the task location outside the display range of the electronic map is marked at an edge of the electronic map corresponding to the task location;
   receiving a switching operation to access at least one accomplished task, switching and only marking the at least accomplished task on the electronic map according to a task location of the at least accomplished task;
   receiving a zoom out operation performed on the electronic map to zoom out the electronic map, and merging the tasks with close task locations to be displayed in a same indicator according to a scale of the zoomed out electronic map, wherein a distance between the task locations of the merged tasks is smaller than a first threshold value; and
   receiving a zoom in operation performed to the electronic map to zoom in the electronic map, and dividing the indicator with a plurality of merged tasks into a plurality of indicators according to a scale of the zoomed in electronic map, wherein a distance between the task locations of the tasks is greater than a second threshold value.

2. The method as claimed in claim 1, wherein after the step of marking each of the tasks on the electronic map according to the corresponding task location, the method further comprises:
   receiving a touch operation performed at a specific location on the electronic map; and
   displaying a dialog window at the specific location to add a new task.

3. The method as claimed in claim 1, wherein the step of marking each of the tasks on the electronic map according to the corresponding task location comprises:
   merging the tasks with close task locations to be displayed in a same indicator, wherein the indicator displays the number of the merged tasks at an average location of the merged tasks on the electronic map.

4. The method as claimed in claim 3, wherein after the step of merging the tasks with close task locations to display the same indicator, the method further comprises:
   receiving a selecting operation performed on the indicator; and
   displaying a list of the tasks merged in the indicator.

5. The method as claimed in claim 1, wherein the step of marking each of the tasks with the task location outside the display range of the electronic map at the edge of the electronic map corresponding to the task location comprises:
   according to a direction of each of the tasks outside the display range relative to a center of the electronic map, displaying an indicator of the task within the electronic map at an edge facing to the direction.

6. The method as claimed in claim 1, wherein the step of marking each of the tasks with the task location outside the display range of the electronic map at the edge of the electronic map corresponding to the task location comprises:
   merging a plurality of tasks at a same edge to be displayed in a same indicator, wherein the indicator displays the number of the tasks.

7. The method as claimed in claim 6, wherein the step of merging the tasks at the same edge to be displayed in the same indicator comprises:
   displaying the indicator in the middle or at an endpoint of the edge of the electronic map.

8. The method as claimed in claim 6, wherein the step of merging the tasks at the same edge to display the same indicator comprises:
   according to a direction of each of the tasks outside the display range relative to a center of the electronic map, calculating an edge location of each of the tasks in the electronic map facing to the direction;
   calculating an average location of the edge locations of the tasks at the same edge; and
   displaying the indicator indicating the number of the tasks at the same edge at the average location.

9. An apparatus for displaying tasks, comprising:
   a touch screen, detecting a touch operation and displaying a frame;
   a storage unit, storing a plurality of tasks and at least one accomplished task;
   a positioning unit, positioning the display apparatus to obtain a positioning location;
   a map display module, displaying an electronic map around the positioning location on the touch screen; and
   a task display module, accessing each of the tasks stored in the storage unit, and marking each of the tasks on the electronic map displayed on the touch screen according to a corresponding task location,
      wherein each task with the task location within a display range of the electronic map is marked at the task location on the electronic map, and
      wherein each task with the task location outside the display range of the electronic map is marked at an edge of the electronic map corresponding to the task location, and
      wherein in response to that the touch screen receives a switching operation, the task display module accesses the at least one accomplished task stored in the storage unit, switches and only marks the at least accomplished task on the electronic map according to a task location of the at least one accomplished task, and
      wherein in response to that the touch screen receives a zoom in operation performed on the electronic map, the map display module zooms in the electronic map, and the task display module divides the indicator with a plurality of merged tasks into a plurality of indicators according to a scale of the zoomed in electronic map, wherein a distance between the task locations of the tasks is greater than a second threshold value.

10. The apparatus as claimed in claim 9, wherein the task display module displays a dialog window to add a new task in response to that the touch screen receives the touch operation performed at the specific location on the electronic map.

11. The apparatus as claimed in claim 9, wherein the task display module merges a plurality of tasks with close task locations to be displayed in a same indicator, wherein the indicator displays the number of the merged tasks.

12. The apparatus as claimed in claim 11, wherein the task display module displays a list of the tasks merged in the indicator in response to that the touch screen receives a selecting operation performed on the indicator.

13. The apparatus as claimed in claim 9, wherein in response to that the touch screen receives a zoom in operation performed on the electronic map, the map display module zooms in the electronic map, and the task display module divides the indicator with a plurality of merged tasks into a plurality of indicators according to a scale of the zoomed in electronic map, wherein a distance between the task locations of the tasks is greater than a second threshold value.

14. A non transitory recording medium, adapted to store a computer program, wherein the computer program is loaded to a mobile apparatus to executed following steps:

positioning the mobile apparatus to obtain a positioning location;

displaying an electronic map around the positioning location; and accessing each task recorded in the mobile apparatus, and marking each of the tasks on the electronic map according to a corresponding task location,
 wherein each task with the task location within a display range of the electronic map is marked at the task location on the electronic map, and
 wherein each task with the task location outside the display range of the electronic map is marked at an edge of the electronic map corresponding to the task location;

receiving a switching operation to access at least one accomplished tasks, switching and only marking the at least accomplished task on the electronic map according to a task location of the at least accomplished task;

receiving a zoom out operation performed on the electronic map to zoom out the electronic map, and merging the tasks with close task locations to be displayed in a same indicator according to a scale of the zoomed out electronic map, wherein a distance between the task locations of the merged tasks is smaller than a first threshold value; and receiving a zoom in operation performed to the electronic map to zoom in the electronic map, and dividing the indicator with a plurality of merged tasks into a plurality of indicators according to a scale of the zoomed in electronic map, wherein a distance between the task locations of the tasks is greater than a second threshold value.

* * * * *